United States Patent [19]
Kaifu et al.

[11] 4,339,510
[45] Jul. 13, 1982

[54] ALUMINUM-BASE BRAZING ALLOY COMPOSITE

[75] Inventors: Masaharu Kaifu; Kazuo Tanaka; Hideo Fujimoto; Jun Takigawa; Tomohiro Nishimura; Yagoro Hirose; Junu Hirai, all of Shimonoseki, Japan

[73] Assignee: Kobe Steel, Ltd., Kobe, Japan

[21] Appl. No.: 144,892

[22] Filed: Apr. 29, 1980

[30] Foreign Application Priority Data

Mar. 28, 1980 [JP] Japan .................................. 55-40781

[51] Int. Cl.³ ............................................ B32B 15/20
[52] U.S. Cl. ...................................... 428/654; 420/529
[58] Field of Search ........................ 75/138, 139, 143; 428/654

[56] References Cited

U.S. PATENT DOCUMENTS 4,164,434  8/1979  Fister et al. ........................... 75/138
4,167,410  9/1979  Anthony et al. ...................... 75/138

*Primary Examiner*—R. Dean
*Attorney, Agent, or Firm*—Oblon, Fisher, Spivak, McClelland & Maier

[57] ABSTRACT

An aluminum-base brazing alloy containing essentially up to 2 wt % of Cu, 0.01 to 0.08 wt % of Ti, and the balance of Al and unavoidable impurities, with or without at least one component selected from the group consisting of 0.01 to 0.5 wt % of Zr, 0.05 to 0.5 wt % of Mn and 0.05 to 0.5 wt % of Cr.

2 Claims, 10 Drawing Figures

ALUMINUM-BASE BRAZING ALLOY COMPOSITE

BACKGROUND OF THE INVENTION

This invention relates to an Al-base brazing alloy which is satisfactory both in resistance to corrosion and mechanical properties.

Aluminum is well known for its good resistance to corrosion. However, in a brazed structure, for instance, in a heat exchanger, Si in the brazing material penetrates into core aluminum alloy to form local cells in the aluminum alloy which surrounds the cores of Si, giving rise to intergranular corrosion. In order to prevent such corrosion, there have been proposed various methods, although none of which succeeded in providing practical measures the preventing the intergranular corrosion. The conventionally proposed methods include:

1. Methods using anodically acting elements (e.g., Zn, Sn, etc.):
   1-a. A method of imparting anodic property to the brazing alloy itself by adding thereto Zn, Sn or the like.
   1-b. A method of using a Zn- or Sn- material in part of brazed structure, e.g., fins of heat exchanger, for protecting other part of the structure by the anodic action of the added elements.
2. Methods of improving and strengthening the intergranular penetration resistance of core aluminum alloy to Si.
3. Method for reforming the core alloy to have cathodic action relative to the brazing material by adding a third component to the core alloy.

Of the above-mentioned methods 1a, the one which employs Zn remarkably improves the resistance to corrosion but has a difficulty in that the brazing furnace is contaminated with vapors of Zn which is spattered due to high vapor pressure at the time of brazing operation. The method which uses Sn instead of Zn is free from the problem of the evaporative spattering but has other problems such as low formability and difficulty of rolling which are detrimental to practical applications. The method 1-b can provide only incomplete protection since it is difficult to protect a structural part like the header tank of a heat exchanger which is not in direct contact with the fins. In the methods 2 and 3, attempts are made to improve the brazing properties, for example, by adding Cu, Fe, Cr, Zr or the like to an aluminum alloy (e.g., alluminum alloy of JIS 3003) which is widely used as a brazing sheet core alloy or by changing conditions of a heat treatment such as soaking, but in any case with unsatisfactory results. The above-mentioned alloy JIS 3003 which contains Mn as one of its major components is well known to have an extremely high resistance to corrosion but needs further improvement in properties since it becomes susceptible to intergranular corrosion upon heating for brazing (i.e., heating at high temperature).

SUMMARY OF THE INVENTION

With the foregoing in view, the present invention has as its object the provision of an aluminum-base brazing alloy which suppresses penetration of a brazing component, especially of Si into the core alloy, and which has low susceptivity to intergranular corrosion.

This object is achieved by an aluminum-base brazing alloy which essentially contains up to 2% by weight of Cu, 0.01 to 0.08% by weight of Ti, and the balance of aluminum and unavoidable impurities, with or without at least one component selected from the group consisting of 0.01 to 0.5% by weight of Zr, 0.05 to 0.5% by weight of Mn, and 0.05 to 0.5% by weight of Cr.

It is to be understood that percentages which appear in this specification are all percentages by weight unless otherwise indicated.

The above and other objects, features and advantages of the invention will become apparent from the following description and appended claims, taken in conjunction with the accompanying drawings.

BRIEF DESCRIPTION OF THE DRAWINGS

In the accompanying drawings:

FIGS. 1–5 are microphotographs of sections of test pieces of Sample Nos. 1, 4, 7, 10 and 11, respectively, of Table 3.

FIGS. 6–10 are microphotographs of sections of test pieces of Sample Nos. 6–10, respectively, of Table 3.

PARTICULAR DESCRIPTION OF THE INVENTION

Figure 1:
FIGS. 1 to 10 are microphotographs of various test pieces (magnification: 100).

As stated hereinbefore, the aluminum-base brazing alloy according to the present invention consists essentially of up to 2% of Cu, 0.01 to 0.08% of Ti, and the balance of Al and unavoidable impurities, with or without at least one component selected from the group consisting of 0.01 to 0.5% of Zr, 0.05 to 0.5% of Mn, and 0.05 to 0.5% of Cr.

In the present invention, the respective components of the brazing alloy are limited to the above-defined particular ranges for the following reasons.

Cu: up to 2%, preferably 0.003–2%

It is known that Cu as an alloy component has the effect of increasing the mechanical strength of aluminum although it is considered to impair the corrosion resistance of aluminum to a considerable degree. However, as a result of experiments, it has been confirmed that, in a case of an Al-base brazing alloy which is heated to 570° to 610° C. in flux or vacuum brazing, the impairment of corrosion resistance by Cu is suppressed to an almost ignorable degree due to the heating effect and the intergranular corrosion suppressing effect of Zr, Mn or Cr which will be explained hereinafter, effectively retaining only the effect of Cu of increasing the strength of aluminum. The upper limit of the Cu content is determined at 2% since the Cu content over 2% it becomes difficult to prevent the drop in corrosion resistance by a heating treatment. The Cu content has no lower limit in particular but is preferred to be not less than 0.003% for its effect of enhancing strength.

Ti: 0.01–0.08%

Ti has the effects of improving penetration resistance and increasing mechanical strength. In order to produce these effects to a significant extent, Ti should be added in an amount not less than 0.01%. Ti however should be added in an amount not more than 0.08% since an excessive Ti content will lower the formability.

At least one component selected from the group consisting of 0.01–0.5% Zr, 0.05–0.5% Mn, & 0.05–0.5% Cr Zr is finely distributed and forms an intermetallic compound ($Al_3Zr$) with Al, with the effects of strengthening subgrains and suppressing recrystallization thereof. Therefore, when the aluminum-base alloy is rolled or extruded, the metal is caused to have fibrous structure with elongated or flattened grains, which do not become equiaxial even under high temperature conditions at the time of brazing operation. As a result, the intergranular penetration of Si from the brazing material is suppressed to improve the intergranular corrosion sensitivity. In order to produce this effect of Zr in a significant degree, it is necessary to add Zr in an amount not less than 0.01%, but an additive amount exceeding 0.5% deteriorates the formability due to production of giant intermetallic compounds.

Similarly to Zr, Mn and Cr also have the effect of strengthening sub-grains to suppress recrystallization, along with an effect of enhancing drawing formability of the core alloy. In order to have these effects, especially the effect of suppressing the intergranular corrosion by prohibition of recrystallization, produced to a significant degree, the additive amount of Mn or Cr should be not less than 0.05%. However, an excessively large additive amount results in a low intergranular corrosion sensitivity due to production of giant intermetallic compounds, and thus they should be added in an amount not more than 0.5%.

Since Zr, Mn and Cr commonly act as components for preventing intergranular corrosion, they may be added either singly or in combination.

Thus, according to the present invention, Cu and Ti are blended into Al, with or without at least one component selected from the group consisting of Zr, Mn and Cr, to provide an aluminum-base brazing alloy which is satisfactory both in mechanical properties and intergranular corrosion sensitivity.

The invention is illustrated more particularly by the following Examples, in which the invention is applied to brazing sheet core alloy. However, it is to be understood that the invention can be applied to heat exchanger fins or various other structural parts.

EXAMPLE 1

Core alloys of Table 1 were prepared, in which Sample Nos. 1 to 8 are of the invention, Sample Nos. 9 and 10 are of comparative alloys, and Sample No. 11 is the alloy of JIS 3003. The balance in the chemical compositions of Table 1 is aluminum.

TABLE 1

| Sample No. | Chemical Composition of Core Alloys (wt %) | | | | | | | | |
|---|---|---|---|---|---|---|---|---|---|
| | Cu | Zr | Mn | Cr | Ti | Fe | Si | Mg | |
| 1 | 0.5 | 0.15 | — | — | 0.03 | 0.5 | 0.1 | — | Invention |
| 2 | 1.0 | — | — | — | 0.03 | 0.5 | 0.1 | — | " |
| 3 | 1.5 | 0.15 | — | — | 0.03 | 0.5 | 0.1 | — | " |
| 4 | 2.0 | 0.15 | — | — | 0.03 | 0.5 | 0.1 | — | " |
| 5 | 1.0 | 0.3 | — | — | 0.03 | 0.3 | 0.07 | — | " |
| 6 | 1.0 | — | 0.3 | 0.15 | 0.03 | 0.5 | 0.1 | — | " |
| 7 | 1.0 | 0.15 | 0.3 | — | 0.03 | 0.5 | 0.1 | — | " |
| 8 | 1.0 | 0.15 | 0.3 | 0.15 | 0.03 | 0.3 | 0.07 | — | " |
| 9 | — | 0.15 | 0.8 | — | 0.03 | 0.5 | 0.1 | — | Comparative |
| 10 | 2.5 | 0.15 | 0.3 | — | 0.03 | 0.5 | 0.1 | — | Comparative |
| 11 | 0.2 | — | 1.2 | — | 0.03 | 0.5 | 0.1 | — | JIS 3003 |

Brazing sheets of 0.6 mm in thickness were prepared by cladding 15% of brazing material consisting of 10% of Al, 1.5% of Si and Mg on each side of the core alloys of the compositions shown in Table 1.

Mechanical Properties after application of brazing heat

The brazing sheets thus obtained were heated at 595° C. for three minutes in vacuum ($10^{-4}$ to $10^{-6}$ Torr) and then immersed in NaOH bath to dissolve off the brazing material, polishing the surfaces of the respective sheets with #600 emery paper. JIS No. 5 test pieces were prepared from these samples and tested for tensile strength, 0.2% yield strength and elongation. The results of the test are shown in Table 2.

TABLE 2

| | Results of Tensile Test | | | |
|---|---|---|---|---|
| Sample No. | Tensile strength ($kg/mm^2$) | 0.2% yield strength ($kg/mm^2$) | Elongation (%) | |
| 1 | 12.6 | 5.2 | 25.0 | Invention |
| 2 | 15.4 | 5.9 | 23.5 | " |
| 3 | 18.4 | 6.9 | 22.8 | " |
| 4 | 21.8 | 8.6 | 22.6 | " |
| 5 | 15.8 | 6.1 | 24.3 | " |
| 6 | 14.7 | 5.7 | 22.8 | " |
| 7 | 15.1 | 5.8 | 24.0 | " |
| 8 | 14.9 | 5.6 | 22.0 | " |
| 9 | 11.2 | 4.6 | 24.5 | Comparative |
| 10 | 24.5 | 12.0 | 22.0 | " |
| 11 | 11.8 | 5.1 | 16.8 | JIS 3003 |

As clear from Table 2 above, the alloys of the present invention are superior to JIS 3003 in all of tensile strength, 0.2% yield strength and elongation, showing sufficient strength as an aluminum core alloy.

Corrosion Test

The brazing sheets which had been prepared as described above were cut into pieces of 80 mm × 80 mm, which were centrally formed with an 8-mm deep groove by Elichsen forming and then heated for three minutes at 595° C. in vacuum ($10^{-5}$ Torr) to obtain test pieces. The test pieces thus obtained were subjected to anodic corrosion test in a bath of 0.1 N aqueous solution of NaCl under the condition of 0.5 mA × 16 hours.

After the anodic corrosion test, sections of the respective test pieces were examined under a microscope to check the depth of maximum pitting corrosion and conditions of corrosion, with results as shown in Table 3. Microphotographs (magnification: 100) of sections of some test pieces after the corrosion test are shown in FIGS. 1 to 5. More particularly, FIGS. 1 to 5 shows the sections of test pieces of Sample Nos. 1, 4, 7, 10 and 11, respectively.

TABLE 3

| | Results of Corrosion Test | | | | |
|---|---|---|---|---|---|
| | Flat portion[*1] | | Formed portion[*2] | | |
| Sample No. | Max. depth (mm) | Condition of corrosion[*3] | Max. depth (mm) | Condition of corrosion[*3] | |
| 1 | 0.07 | S | 0.08 | S | Invention |
| 2 | 0.11 | M | 0.09 | M | " |
| 3 | 0.12 | S | 0.13 | S | " |
| 4 | 0.14 | M | 0.15 | M | " |
| 5 | 0.09 | S | 0.13 | S | " |
| 6 | 0.11 | M | 0.08 | S | " |
| 7 | 0.10 | M | 0.09 | M | " |
| 8 | 0.09 | S | 0.10 | M | " |
| 9 | 0.12 | L | 0.13 | L | Comparative |
| 10 | 0.21 | M | 0.23 | L | " |
| 11 | 0.32 | L | 0.32 | L | JIS 3003 |

[*1] Flat portion free of the effect of Elichsen forming.
[*2] Protruded distal end formed by Elichsen forming.
[*3] Intergranular corrosion: S (small), M (Medium), L (large).

As is clear from Table 3, Samples of the invention (Nos. 1 to 8) are all superior to JIS 3003 in the resistance to intergranular corrosion. In contrast, absence of Cu content (No. 9) or an excessive Mn content (No. 11) results in conspicuous intergranular corrosion and thus fails to attain the afore-mentioned object of the invention. An alloy with an excessive Cu content (No. 10) is slightly better than an alloy without Cu content (No. 9) but low in formability due to high tensile and 0.2% yield strengths as shown in Table 2.

Figure 4:
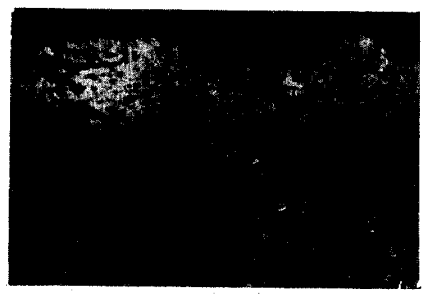
Figure 2:
Figure 5:
Figure 3:
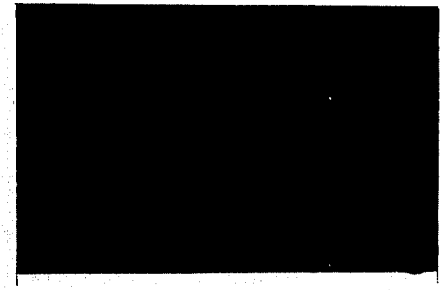
Figure 6:
Figure 7:
Figure 10:
Figure 8:
Figure 9:
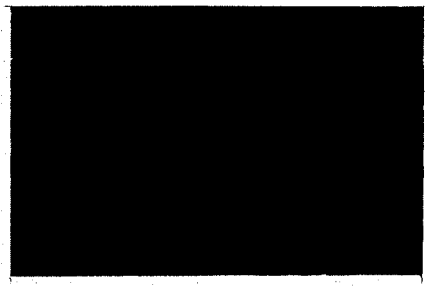

Upon comparing the sectional microphotographs, it will be seen that the test pieces of FIGS. 1 to 3 (Invention) are almost free of corrosion in contrast to test pieces of FIG. 4 (comparative) and FIG. 5 (JIS 3003) in which corrosion has progressed to a deep portion along grain boundary.

Measurement of Corrosion Potential

Aluminum alloy sheets (0.4 mm thick) of the compositions of Table 1 and the afore-mentioned brazing sheets were heated at 595° C. for five minutes in vacuum ($10^{-5}$ Torr) to prepare test samples. The corrosion potentials of the test samples thus obtained were measured after immersion in a 0.5 N aqueous solution of $AlCl_3$, with the results shown in Table 4 below.

TABLE 4

| | CORROSION POTENTIAL (mV) | | |
|---|---|---|---|
| Sample No. | Core alone | Brazing sheet | |
| 1 | −717 | −677 | Invention |
| 2 | −683 | −678 | " |
| 3 | −665 | −670 | " |
| 4 | −658 | −667 | " |
| 5 | −690 | −670 | " |
| 6 | −685 | −670 | " |
| 7 | −680 | −672 | " |
| 8 | −678 | −670 | " |
| 9 | −776 | −683 | Comparative |
| 10 | −643 | −660 | " |
| 11 | −742 | −673 | JIS 3003 |

As is clear from Table 4, the conventional material JIS 3003 has a potential far less-noble than that on the surface of the brazing sheet, which indicates that the corrosion of the core alloy is apt to be electrically accelerated by the brazing material. In contrast to JIS 3003, the test samples according to the invention all have noble corrosion potentials, which become nobler with increases in Cu content, approaching the corrosion potential on the surface of the brazing sheet. Thus, the alloy of the present invention is less susceptible to electrochemical corrosion as compared with conventional counterparts.

EXAMPLE 2

Core alloys of the compositions of Table 5 were prepared. Sample Nos. 12 to 14 are core alloys of the invention while Sample Nos. 15 and 16 are core alloys which were employed for the purpose of comparison. The balance in each of the compositions in Table 5 is aluminum.

TABLE 5

| | (wt %) | | | | | | | | |
|---|---|---|---|---|---|---|---|---|---|
| Sample No. | Mn | Cu | Zr | Cr | Ti | Zn | Si | Mg | Fe |
| 12 | 0.005 | 0.003 | 0.13 | 0.16 | 0.009 | 0.05 | 0.15 | 0.002 | 0.52 |
| 13 | 0.008 | 0.282 | 0.15 | 0.15 | 0.055 | 0.006 | 0.088 | 0.001 | 0.56 |
| 14 | 0.30 | 0.30 | 0.13 | 0.008 | 0.050 | 0.009 | 0.075 | tr | 0.13 |
| 15 | 1.22 | 0.19 | — | 0.003 | 0.023 | 0.02 | 0.12 | 0.02 | 0.55 |
| 16 | 1.22 | 0.19 | — | 0.21 | 0.028 | 0.03 | 0.13 | 0.02 | 0.55 |

Cladded on each side of these core alloys was 15% of a brazing material of the composition of Table 6 below to obtain 6-mm thick brazing sheets.

TABLE 6

| (wt %) | | | |
|---|---|---|---|
| Mn | 0.004 | Si | 7.55 |
| Cu | 0.002 | Mg | 0.002 |
| Cr | 0.002 | Fe | 0.35 |
| Ti | 0.004 | Li | 0.004 |
| Zn | 0.006 | Al | balance |

An 8-mm deep groove was formed at the center of each sheet by Elichsen forming according to JIS Z-2247 (Erichsen Test Method), then heating each sheet at 605° C. for two minutes in an $N_2$ gas atmosphere (with a dew point below −60° C.) to provide test pieces. The respective sheets were subjected to anodic corrosion test in which the distal end of the protrusion on the opposite side of the groove was set in position opposing the electrode under the following conditions.

Corrosive Liquid: Aqueous solution of 0.3 wt % Nacl
Current: 0.2 $mA/cm^2$, 16 hours.

Microphotographs (magnification: 100) of sectioned surfaces along the grooves of the Sample pieces of 6 to 10, which were corroded in Keller's etching reagent, are given in FIGS. 6 to 10, respectively. Considerable intergranular corrosion is observed in the test pieces of FIGS. 9 and 10, in contrast to the test pieces of FIGS. 6 to 8 which are almost free of corrosion due to high intergranular corrosion resistance. It is also observed that in the test pieces of FIGS. 9 and 10 (with excessive Mn), the corrosion progresses along relatively fine grains.

What is claimed is:

1. A brazing material of low susceptivity to intergranular corrosion comprising an aluminum alloy core consisting essentially of 0.003 to 2 wt.% of Cu, 0.01 to 0.08 wt.% of Ti, and the balance of Al, and clad thereupon an aluminum-base brazing alloy.

2. A brazing material of low susceptivity to intergranular corrosion comprising an aluminum alloy core consisting essentially of 0.003 to 2 wt.% of Cu, 0.01 to 0.08 wt.% of Ti, at least one component selected from the group consisting of 0.01 to 0.5 wt.% of Zr, 0.05 to 0.5 wt.% of Mn and 0.05 to 0.5 wt.% of Cr, and the balance of Al, and clad thereupon an aluminum-base brazing alloy.

* * * * *